US008817127B2

(12) United States Patent
Kusaka

(10) Patent No.: US 8,817,127 B2
(45) Date of Patent: Aug. 26, 2014

(54) IMAGE CORRECTION DEVICE FOR IMAGE CAPTURE DEVICE AND INTEGRATED CIRCUIT FOR IMAGE CORRECTION DEVICE

(75) Inventor: Hiroya Kusaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/439,375

(22) Filed: Apr. 4, 2012

(65) Prior Publication Data

US 2012/0188398 A1 Jul. 26, 2012

Related U.S. Application Data

(63) Continuation of application No. PCT/JP2011/000063, filed on Jan. 11, 2011.

(30) Foreign Application Priority Data

Apr. 16, 2010 (JP) .................. 2010-094685

(51) Int. Cl.
| H04N 5/228 | (2006.01) |
| H04N 5/14 | (2006.01) |
| H04N 5/225 | (2006.01) |
| H04N 5/257 | (2006.01) |
| H04N 5/232 | (2006.01) |

(52) U.S. Cl.
CPC ....... *H04N 5/23248* (2013.01); *H04N 5/23222* (2013.01); *H04N 5/23219* (2013.01); *H04N 5/232* (2013.01)
USPC ............... 348/222.1; 348/571; 348/207.99; 348/211.1

(58) Field of Classification Search
CPC ... H04N 5/232; H04N 5/225; H04N 5/23222; H04N 5/14; H04N 5/228; H04N 5/23219; H04N 5/23248; H04N 5/23258; H04N 5/2353; H04N 1/00336; H04N 1/215; H04N 2101/00; H04N 1/00326
USPC ................. 348/208.2, 208.4, 208.11, 208.12, 348/208.13, 208.14, 208.16
See application file for complete search history.

(56) References Cited

U.S. PATENT DOCUMENTS 7,542,072 B2 * 6/2009 DeMenthon ............. 348/207.99
8,005,295 B2 8/2011 Nobori
(Continued)

FOREIGN PATENT DOCUMENTS

| JP | 62-153816 | 7/1987 |
| JP | 1-125064 | 5/1989 |

(Continued)

*Primary Examiner* — Twyler Haskins
*Assistant Examiner* — Padma Haliyur
(74) *Attorney, Agent, or Firm* — Hamre, Schumann, Mueller & Larson, P.C.

(57) ABSTRACT

Provided is an image capture device capable of suppressing blurring of images and keeping a subject image at the start of capturing in the picture frame, even when a plurality of objects such as persons are photographed over a long time. The image capture device includes: an imaging optical system 1; an image capture element 2; a feature detector unit (face detector unit 8) for detecting the features of the objects contained in an image represented by an image signal obtained by the image capture element 2; a movement quantity detector unit for detecting the movement quantities of the features including the face regions of the human figures; and a composition change correction unit for correcting a change in the composition of the image based on the movement quantities of the face regions.

3 Claims, 8 Drawing Sheets

(56) References Cited

U.S. PATENT DOCUMENTS

2008/0075337 A1    3/2008  Fukushi
2008/0260375 A1*  10/2008  Yumiki .................. 396/263
2009/0207260 A1*   8/2009  Furukawa .............. 348/208.4

FOREIGN PATENT DOCUMENTS

| JP | 5-066450 | 3/1993 |
|---|---|---|
| JP | 7-128619 | 5/1995 |
| JP | 9-261524 | 10/1997 |
| JP | 2007-074620 | 3/2007 |
| JP | 2008-079055 | 4/2008 |
| JP | 2008-270983 | 11/2008 |
| JP | 2008-301355 | 12/2008 |
| JP | 2009-003392 | 1/2009 |
| JP | 2009-038572 | 2/2009 |
| JP | 2009-290782 | 12/2009 |
| JP | 2010-081304 | 4/2010 |
| WO | WO 2008/108071 | 9/2008 |

* cited by examiner

FIG. 4A

| PERSON | X-COORDINATE | Y-COORDINATE |
|--------|--------------|--------------|
| 1 | x1 | y1 |
| 2 | x2 | y2 |
| 3 | x3 | y3 |

FIG. 4B

| PERSON | X-COORDINATE | Y-COORDINATE |
|--------|--------------|--------------|
| 1 | x1(n) | y1(n) |
| 2 | x2(n) | y2(n) |
| 3 | x3(n) | y3(n) |

FIG. 4C

| PERSON | X-COORDINATE | Y-COORDINATE |
|--------|--------------|--------------|
| 1 | x1(n+1) | y1(n+1) |
| 2 | x2(n+1) | y2(n+1) |
| 3 | x3(n+1) | y3(n+1) |

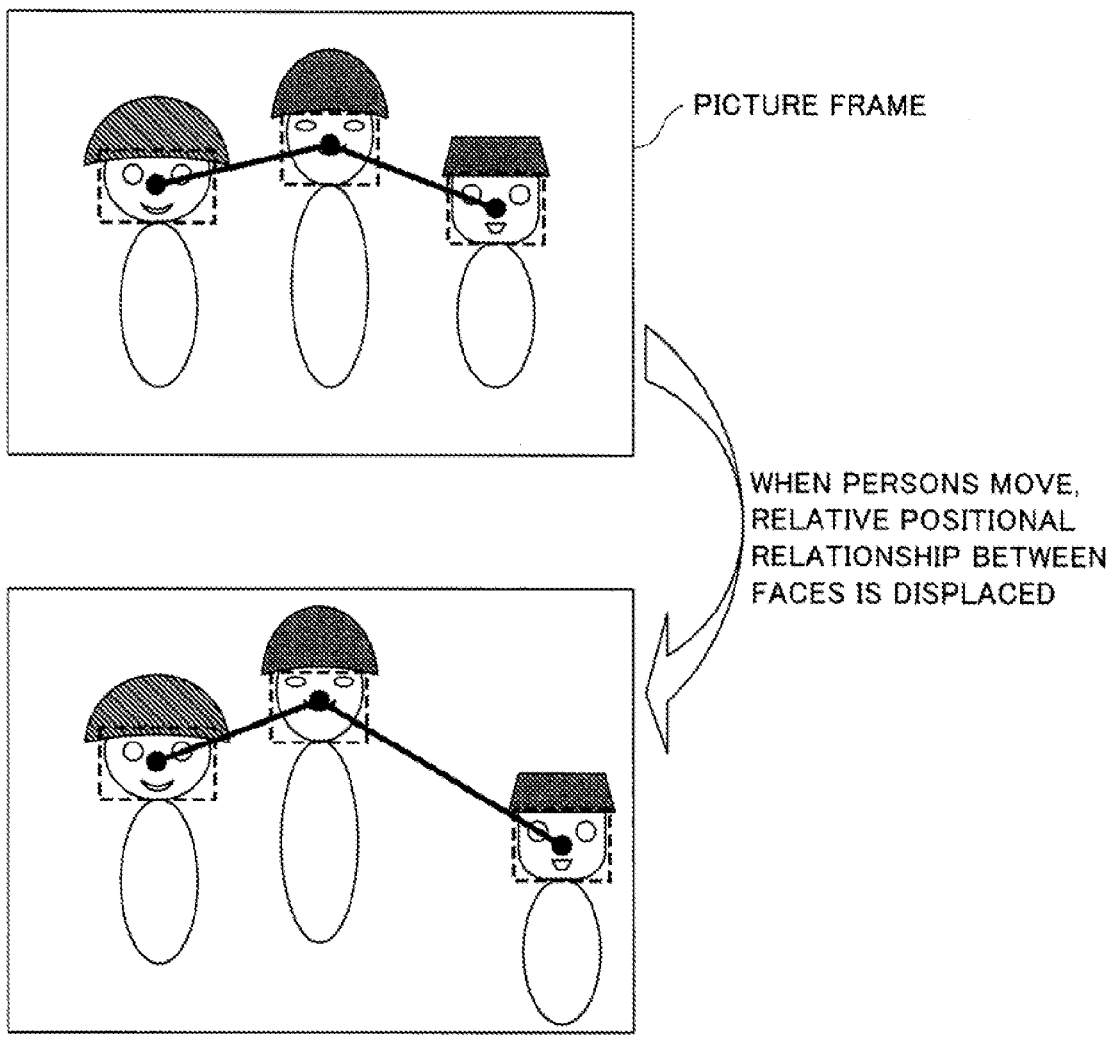

FIG. 6A
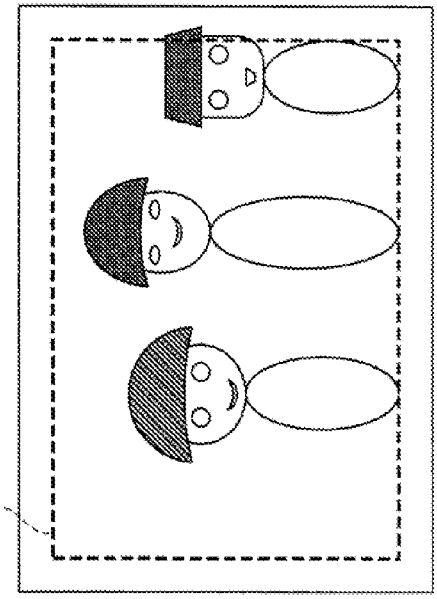
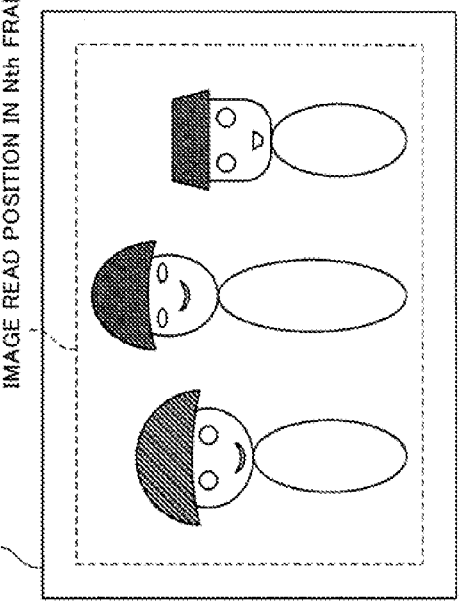
FIG. 6B
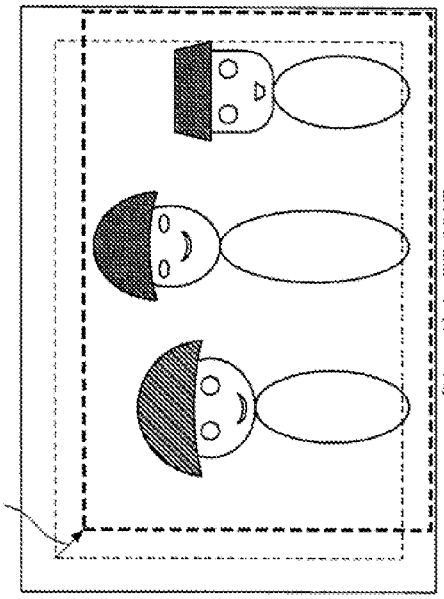
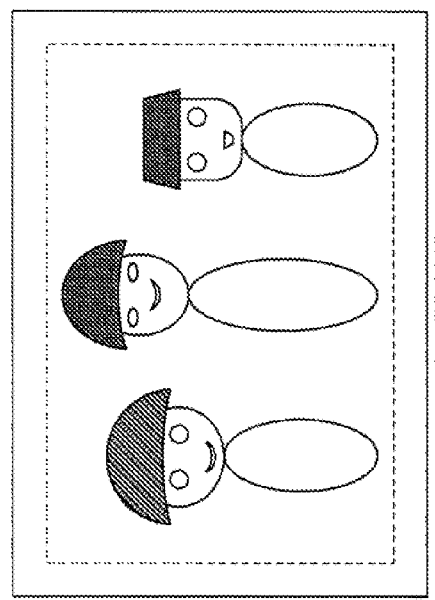

IMAGE CORRECTION DEVICE FOR IMAGE CAPTURE DEVICE AND INTEGRATED CIRCUIT FOR IMAGE CORRECTION DEVICE

TECHNICAL FIELD

The present invention relates to image blur Correction devices for correcting changes of compositions such as movements of images due to movements of image capture devices, and so on.

BACKGROUND ART

In recent years, consumer digital still cameras and video cameras (hereinafter, will be referred to as "video movies") have had unstable images displayed on screens thereof due to hand movement, and so on when capturing images. In order to solve the problem, digital still cameras and video movies including image blur correction devices have been developed or commercialized.

For example, there has been a method in which a variable angle prism is provided for the optical system of an image capture device, the movement of the image capture device is detected by an acceleration sensor, and according to the detection result, the variable angle prism is drivingly controlled to correct the motion of an image (e.g., see Patent Literature 1).

As another example, there has been proposed an imaging optical system having a variable power optical group or focusing group and a correction optical mechanism for decentering or tilting the optical axis of the imaging optical system (e.g., see Patent Literatures 2 and 3).

Further, for example, there has been known a method for correcting the motion of an image by moving a charge-coupled device (CCD) in a direction orthogonal to the optical axis (e.g., see Patent Literature 4).

In the above-described image blur correction devices, angular velocity sensors (gyro sensors) are mainly used which detect the shake of the image capture devices for the purpose of detecting the movement. Specifically, the angular velocity of movement of the image capture device is detected by the angular velocity sensor, integration is performed on the detected data to obtain the shake angle of the image capture device, and in accordance with the shake angle, the above-described variable angle prism is drivingly controlled. Further, the optical image of a subject is optically moved, so that the motion of the image is corrected.

In addition, there has been known a method for correcting the motion of the image by electronic processing.

For example, a captured image is temporarily stored in a memory, the motion vector of the entire image between continuous image frames is detected by a representative point matching method, and only a part of the image stored in the memory is read in accordance with the motion vector, so that the motion of the image is corrected (e.g., see Patent Literature 5).

Further, for example, there has been disclosed a technique for detecting the motion of a face of a subject in an image instead of the motion vector of the entire image to prevent the subject from being blurred (e.g., see Patent Literature 6). In this technique, a blur suppression unit is controlled in accordance with the motion of the subject (face), so that the relative position of the subject image in the picture frame can be fixed, as shown in FIG. 4 of Patent Literature 6. In other words, the motion of the subject image can be suppressed or the subject image can be followed to capture an image.

CITATION LIST

Patent Literatures

Patent Literature 1: Japanese Patent Application Laid-Open Publication No. 62-153816
Patent Literature 2: Japanese Patent Application Laid-Open Publication No. 5-66450
Patent Literature 3: Japanese Patent Application Laid-Open Publication No. 7-128619
Patent Literature 4: Japanese Patent Application Laid-Open Publication No. 9-261524
Patent Literature 5: Japanese Patent Application Laid-Open Publication No. 1-125064
Patent Literature 6: Japanese Patent Application No. 2007-74620

SUMMARY OF INVENTION

Technical Problem

As described above, it is well known that multiple methods have been proposed and practical applications have been developed for the image blur correction devices, but the methods and applications have some problems.

As one of the problems, for example, when the shake of the image capture device is detected by the angular velocity sensor (for example, a gyro sensor), a high-pass filter (HPF) is required for removing extremely low-frequency drift components contained in the output of the angular velocity sensor. The high-pass filter is effective in removing the drift components of the angular velocity sensor but removes or reduces even a slow-motion signal of the image capture device as a side effect. Thus, when the angular velocity sensor is used, it is difficult to accurately detect the slow motion of the image capture device. With a camera held in a hand for a long time, the movement of a captured image in accordance with the slow motion of the hand or body cannot be corrected, and it is difficult to keep a subject image at the start of capturing in the picture frame over a long time. Hence, a photographer has to frequently fine-tune an imaging direction while confirming an image to be captured via the display device of the camera (liquid crystal display or electronic finder) during capturing.

A similar phenomenon occurs when the motion vector is detected from the captured image. When the motion vector is detected between continuous image frames, the slow motion is a small value as the motion vector, and is likely to be buried in errors. Consequently, as described above, it is difficult to keep the subject image in the picture frame over a long time.

One of effective methods for solving the problems is tracking photographing, a method in which a specific subject image such as a face is recognized and an optical element is controlled such that the subject image is fixed to a given position in the picture frame, as disclosed in Patent Literature 6.

In the example of Patent Literature 6, in the case where a plurality of persons are photographed, a face which is desired to continue being fixed to the given position in the picture frame has to be distinguished from the other faces. However, the identification of the specific face is extremely difficult as compared to the detection of faces. Further, since the orientation, angle, and expression of a face usually change during capturing over a long time, the identification of a face becomes more difficult.

The present invention has been devised to solve the above-described problems. An object of the present invention is to provide an image capture device capable of suppressing blurring of images and keeping a subject image at the start of capturing in the picture frame, even when a plurality of objects such as persons are photographed over a long time. Another object of the present invention is to provide an integrated circuit for achieving the image capture device.

Solution To Problem

In order to solve the problems, an image capture device according to the present invention includes: an imaging optical system for forming the optical image of a subject; an image capture element for converting the formed optical image into an image signal; a feature detector unit for detecting the features of a plurality of objects contained in an image represented by the image signal, based on the image signal obtained by the image capture element; a positional relationship detector unit for detecting the positional relationship of the features of the objects; a movement quantity detector unit for detecting movement quantities of the features of the objects; and a composition change correction unit for correcting a change in the composition of the image based on the detection results of the positional relationship detector unit and the movement quantity detector unit.

Thus, it is possible to provide an image capture device capable of suppressing blurring of images and keeping a subject image at the start of capturing in the picture frame even when a plurality of objects such as persons are photographed over a long time.

Advantageous Effects of Invention

According to the present invention, even when a plurality of persons are photographed over a long time, blurring of images can be suppressed, and the subject image at the start of capturing can be kept in the picture frame.

BRIEF DESCRIPTION OF DRAWINGS

FIG. 4A shows a table storing the positions of faces according to the first embodiment.

FIG. 4B shows a table storing the positions of the faces according to the first embodiment.

FIG. 4C shows a table storing the positions of the faces according to the first embodiment.

FIG. 5 is a diagram illustrating the relative positions of subjects according to the first embodiment.

FIG. 6A is a diagram illustrating a correction effect according to the first embodiment.

FIG. 6B is a diagram illustrating a correction effect according to the first embodiment.

DESCRIPTION OF EMBODIMENTS

Referring to the accompanying drawings, the following will describe embodiments of the preset invention.

First Embodiment

Figure 1:
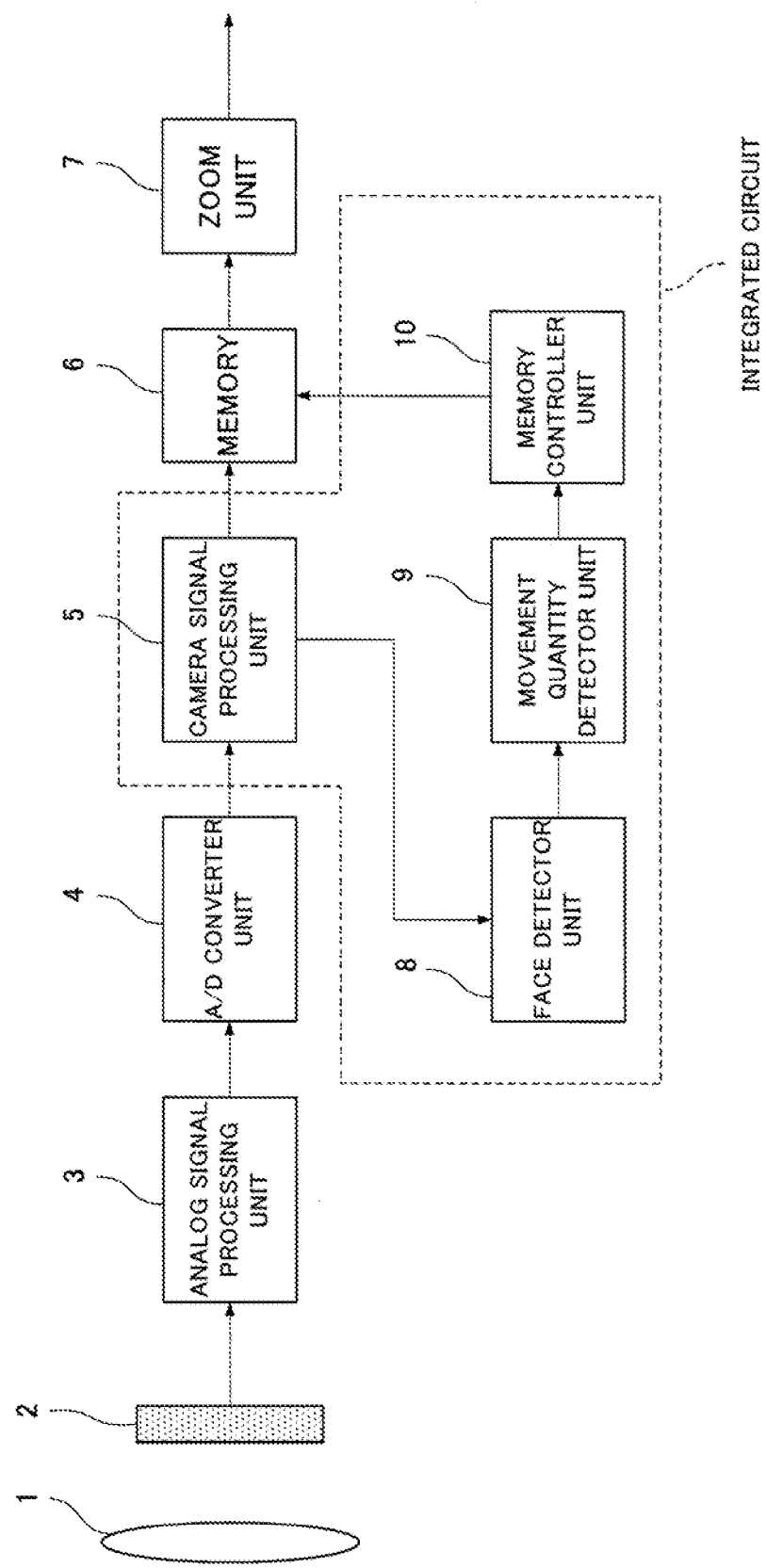
FIG. 1 is a block diagram of an image capture device according to a first embodiment of the present invention.

FIG. 1 is a block diagram of an image capture device according to a first embodiment of the present invention. The image capture device includes an image capture lens 1, an image capture element 2, an analog signal processing unit 3, an A/D converter unit 4, a camera signal processing unit 5, a memory 6, a zoom unit 7, a face detector unit 8, a movement quantity detector unit 9, and a memory controller unit 10.

The image capture lens 1 is an example of an imaging optical system which provides an optical image of a subject on the imaging surface of the image capture element 2. The image capture element 2 is a photoelectric conversion device which has the imaging surface and converts the optical image of the subject formed on the imaging surface into an electric signal (hereinafter, will be also referred to "an image signal"). The image capture element 2 is, for example, a CCD or MOS image sensor. A period in which the image capture element 2 of the present embodiment can capture the image signal is, as an example, 60 frames per second.

The analog signal processing unit 3 performs analog signal processing such as noise reduction on the image signal obtained by the image capture element 2. The A/D converter unit 4 converts an analog signal to a digital signal. The image signal converted to a digital signal by the A/D converter unit 4 is subjected to signal processing such as division into a luminance signal and a color-difference signal, gamma correction, sharpness enhancement, and so on by the camera signal processing unit 5.

The memory 6 temporarily stores the image signal subjected to the processing by the camera signal processing unit for each imaging period. The memory 6 can read out and output an image signal stored from any address under the control of the memory controller unit 10 which will be described later. The zoom unit 7 performs pixel count conversion on an image signal outputted from the memory 6. The pixel count conversion which converts a low-pixel image into a high-pixel image is performed by interpolation such as a bicubic method.

The face detector unit 8 detects a face region as a feature of a human figure, which is an object contained in an image represented by the image signal obtained by the camera signal processing unit 5. Specifically, a region in the image where a human face appears is detected from a luminance signal contained in the image signal for each imaging period. In the present embodiment, the region is recognized as a rectangular region. The face detector unit 8 supplies positional information in the picture frame of the detected rectangular region (for example, the coordinate value of centroid point of the rectangular region) to the movement quantity detector unit 9 which will be described later. In the present embodiment, the face detector unit 8 can detect a plurality of faces from one image at the same time. Faces can be detected by various methods, for example, by matching the faces with templates corresponding to preset shapes and lines of faces. In the present embodiment, the method for detecting faces is not limited to a particular method and may be any method including known methods.

The movement quantity detector unit 9 also functions as a positional relationship detector unit for detecting the positional relationship of a plurality of objects, and stores the positions of faces detected by the face detector unit 8 and the positional relationship of the faces. Further, a difference between the positions of faces in an image obtained in another imaging period, for example, in the previous imaging period (also referred to as "the previous frame") and the positions of faces in the current frame is calculated as a vector. Moreover, the movement quantity detector unit 9 instructs the revision of the image in the current frame based on the vector such that the positions of the faces in the current frame substantially match the positions of the faces in the other frame. For example, the movement quantity detector unit 9 instructs the memory controller unit 10 to change and control an image read address from the memory 6 in a direction eliminating the difference between the positions of the faces in the image of the current frame. Specifically, an image read position is controlled such that a position displaced by the vector from the image read position of the previous frame is read.

At this point, the movement quantity detector unit 9 further calculates variations in the relative positions of detected faces between different frames, for example, continuous frames. When at least a certain degree of changes occurs in the relative positional relationship of faces in the previous frame and the relative positional relationship of faces in the current frame, the change and control of an image read address from the memory 6 is stopped. This is because it is not preferable that the change of a composition be corrected by motion correction when a plurality of persons in subjects individually and greatly move.

The memory controller unit 10 is an example of a composition change correction unit (motion correction unit) for correcting the change of a composition by correcting the motion of an image based on the movement quantity of a face region detected by the movement quantity detector unit 9. The memory controller unit 10 controls an image read address from the memory 6 in response to an instruction from the movement quantity detector unit 9 and causes the memory 6 to output an image in any position. Thus, an image signal is outputted from the memory 6 as an image in which a plurality of faces are substantially the same in a position relative to a picture frame between continuous frames. At this point, the image outputted from the memory 6 is obtained by cutting out a part of an image having been inputted to the memory 6. Thus, the data amount (pixel count) is reduced. The zoom unit 7 compensates the reduction and converts the image to an image having the same pixel count as the original image or any pixel count.

Figure 2A:
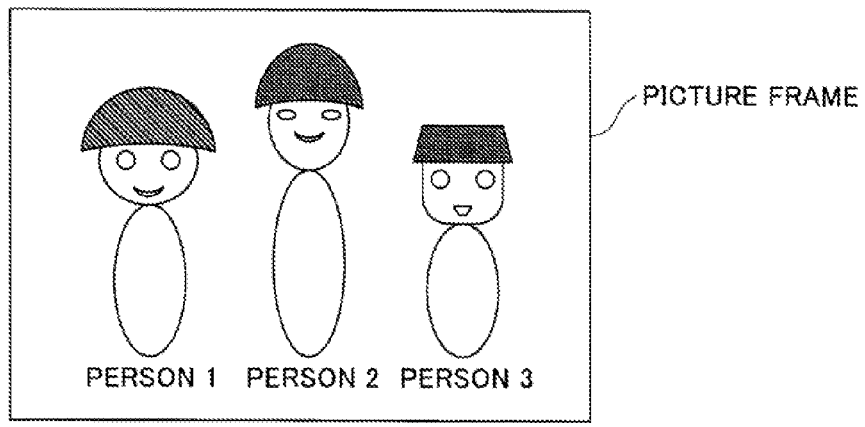
FIG. 2A is an explanatory diagram showing an example of a subject image according to the first embodiment.

Operations of the image capture device of the present embodiment as configured above will be described using FIGS. 2A to 2C and the flowchart of FIG. 3. FIG. 2 is an example of a subject image for the purposes of illustration. FIG. 2A shows the subject image in which three persons are arrayed in a line. A photographer captures this image. At this point, the image signal of the image in FIG. 2A is sent from the image capture element 2 to the memory 6 and the face detector unit 8 via the analog signal processing unit 3, the A/D converter unit 4, and the camera signal processing unit 5.

Figure 2B:
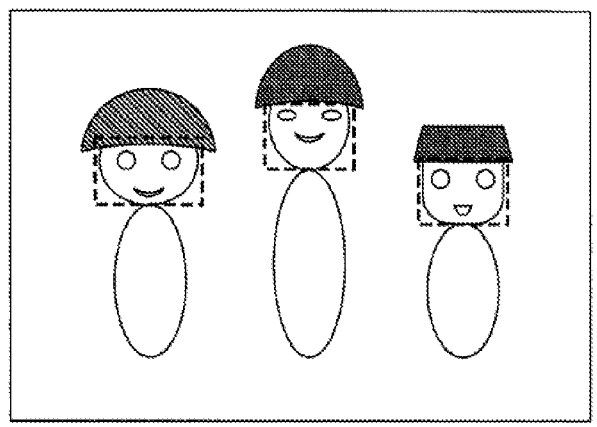
FIG. 2B is an explanatory diagram showing the example of the subject image according to the first embodiment.
Figure 2C:
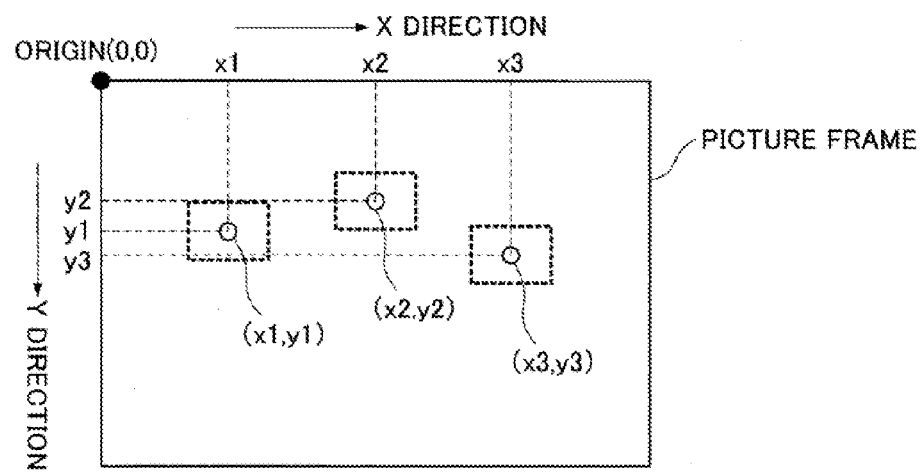
FIG. 2C is an explanatory diagram showing the example of the subject image according to the first embodiment.

Rectangular portions surrounded by the dotted lines of FIG. 2B are detected as the face regions of the subject image. Positional information obtained from the detected face regions (positional information supplied to the movement quantity detector unit 9) is coordinate values (x1, y1), (x2, y2), and (x3, y3) corresponding to the centroid positions of the three rectangles as shown in FIG. 2C. The face detector unit 8 detects the face regions and the positional coordinates from the captured image, and corresponds to step 101 in the flowchart of FIG. 3.

Figure 3:
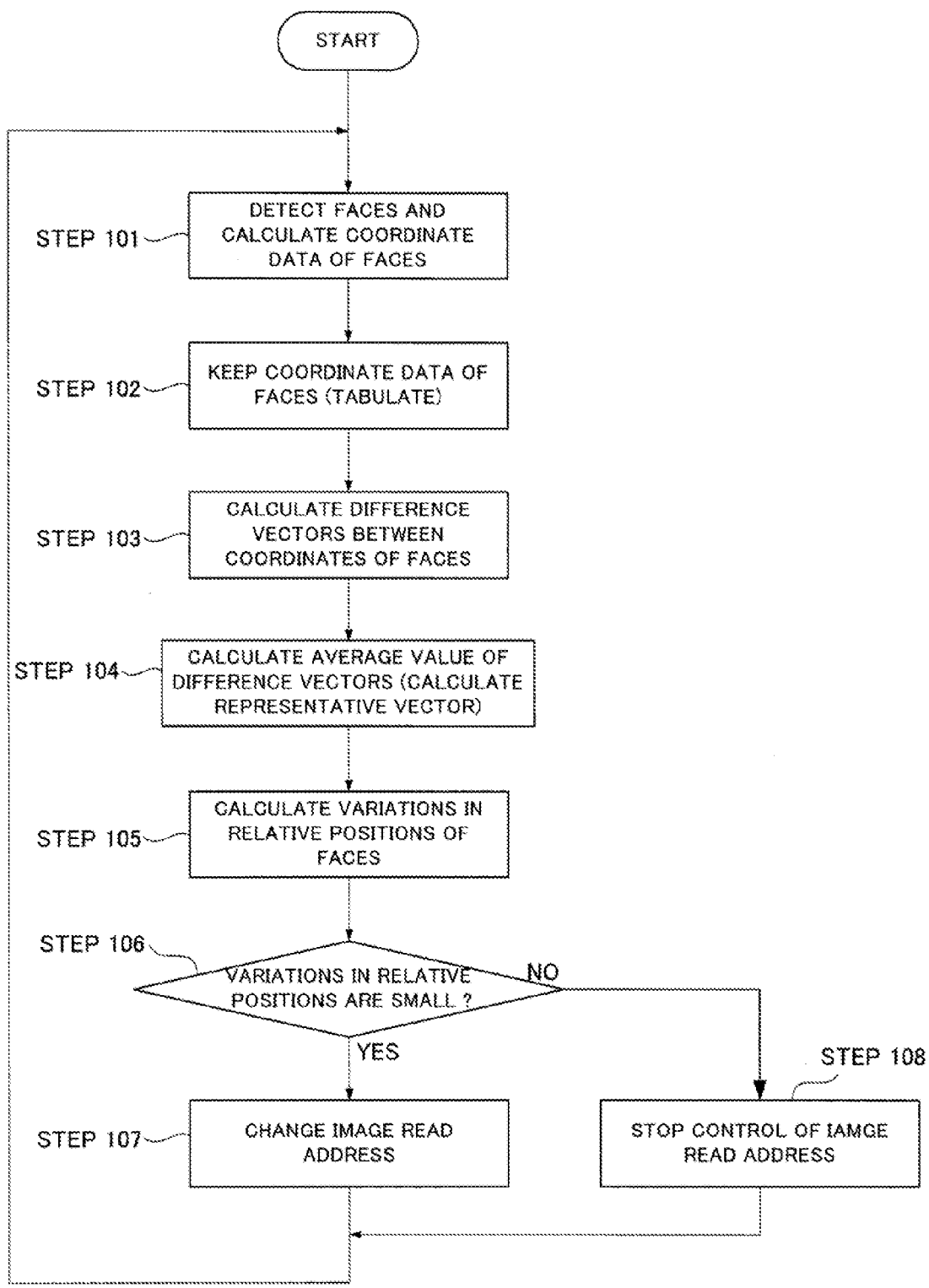
FIG. 3 is a flowchart showing a sequence of steps according to the first embodiment.

The movement quantity detector unit 9 holds the positions of the three faces in such tables as shown in FIGS. 4A to 4C (step 102 in FIG. 3). The coordinate values for the respective faces are stored in the tables in order, for example, from the face on the far left of the screen. Differences (difference vectors) between the positional coordinate values of individual faces are obtained from the positional information of the multiple faces obtained for respective imaging periods (step 103). A cycle from step 101 to step 107 or 108 is synchronized with one imaging period. For example, when the coordinate value table obtained in the $N_{th}$ frame is shown in FIG. 4B and the coordinate value table obtained in the next $(N+1)_{th}$ frame is shown in FIG. 4C, the differences between the positional coordinate values of the individual faces are calculated by x1 (n+1)−x1 (n) in the x direction and y1 (n+1)−y1 (n) in the y direction, for example, with respect to a person 1. The differences can be calculated with respect to persons 2 and 3 in the same manner.

Subsequently, the movement quantity detector unit 9 obtains a representative value such as the average or median of the difference vectors obtained for the respective faces to obtain motion representing the movement quantities of the whole faces of the subject (a representative vector) (step 104). A representative vector obtained from the $N_{th}$ frame (N) and the $(N+1)_{th}$ frame (N+1) is represented by a representative vector (N+1).

The movement quantity detector unit 9 then obtains relative positional relationships between multiple faces contained in an image of one frame, compares the relative positional relationships between continuous frames; and obtains the variations of the relative positions (step 105). The variations may be obtained using differences between the absolute values or square values of distances between the coordinates of the faces, but how to obtain the variations is not limited to this. When the relative positions of multiple faces in an image largely differ between frames, persons largely move in the subject (FIG. 5), thereby making it difficult to determine which face should be fixed to which part in the picture frame. Even if, under such a circumstance, the obtained representative vector is used to control an image read address from the memory 6, an image may be outputted which provides the photographer with a feeling of strangeness. Thus, the variations of the relative positions are detected. When the variations are a certain value or larger, the memory controller unit 10 stops the control of an image read address from the memory 6 and keeps a certain position, for example, the read address in the previous frame (steps 106 and 108).

Conversely, when the variations are the certain value or smaller, the movement quantity detector unit 9 instructs the memory controller unit 10 to move an image read position from the memory 6 to a position indicated by the representative vector (steps 106 and 107). Further, the memory controller unit 10 controls the image read address of the frame (N+1) based on the representative vector (N+1). FIGS. 6A to 6C each schematically show this operation. FIG. 6A schematically shows an operation when the image read position from the memory 6 is fixed without carrying out the above-described processing (steps 101 to 107). In the $N_{th}$ frame on the left side and the $(N+1)_{th}$ frame on the right side of FIG. 6A, in the case where the image read position from the memory 6 is fixed, the position of the subject image is seen to have changed in the picture frame of an image outputted from the memory 6. This is because which region of the image to be outputted is determined in accordance with the image read position from the memory 6. However, as shown in FIG. 6B, with reference to the image read position in the $N_{th}$ frame, a position displaced by the representative vector detected from the face positions is set as a read position from the memory 6, so that the faces are seen to have substantially stopped in the picture frame of the image outputted from the memory 6.

The above-described operation from steps 101 to 108 is performed for each imaging period, so that the subject image at the start of capturing can be kept in the picture frame without image blurring to prevent a change in composition, even when a plurality of persons are photographed over a long time.

The camera signal processing unit 5, the face detector unit 8, the movement quantity detector unit 9, or the memory controller unit 10 is achieved by, for example, a microcomputer. The microcomputer is achieved by an integrated circuit and has an image signal input unit for receiving the input of an image signal, a CPU, and a storage unit. In the storage unit, a program for achieving the function of the camera signal processing unit 5, the face detector unit 8, the movement quantity detector unit 9, or the memory controller unit 10 is stored, and based on the program, the function of the camera signal processing unit 5, the face detector unit 8, the movement quantity detector unit 9, or the memory controller unit 10 is achieved.

Second Embodiment

An image capture device according to a second embodiment of the present invention will be described with reference to FIG. 7. In the present embodiment, the configuration of a correction optical mechanism for decentering or tilting the optical axis of the imaging optics will be described as a motion correction unit for correcting the motion of a subject image. The same elements in FIG. 7 as in FIG. 1 of the first embodiment are indicated by the same reference numerals, and an explanation thereof is omitted.

Figure 7:
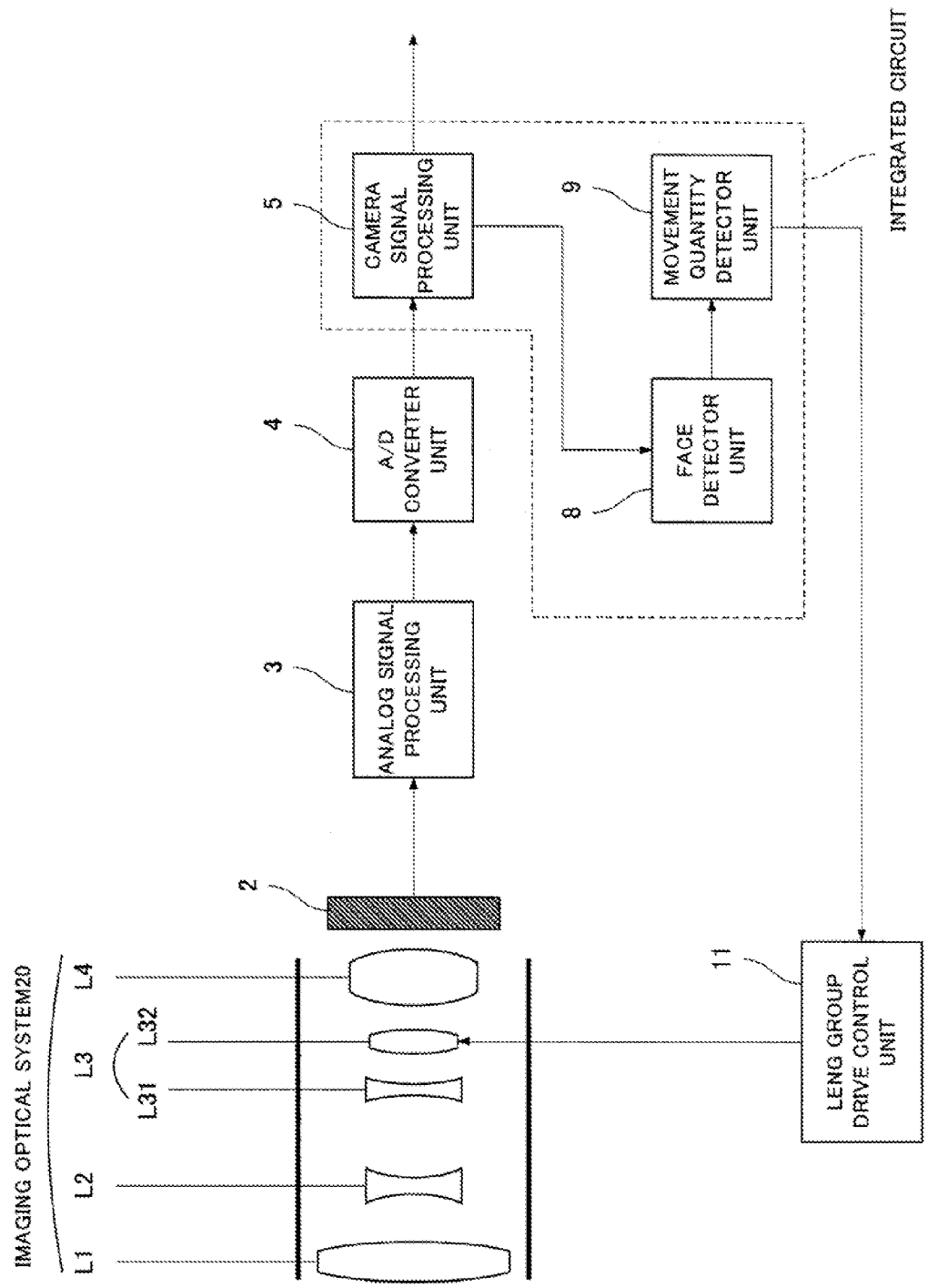
FIG. 7 is a block diagram of an image capture device according to a second embodiment of the present invention.

FIG. 7 is a block diagram of the image capture device according to the second embodiment of the present invention. An imaging optical system 20 is composed of four lens groups L1, L2, L3, and L4. The lens group L2 moves in the optical axis direction to perform zooming, and the lens group L4 moves in the optical axis direction to perform focusing. The lens group L3 is composed of two lens groups L31 and L32 which are disposed closer to the imaging area than the lens group L2, and the lens group L32 which is a part of the lens group L3 moves in a direction orthogonal to the optical axis to decenter the optical axis and move the optical image of the subject formed on an image capture element. The optical image is moved according to the motion of the image, so that the motion of the image is corrected. At this point, a displacement (movement distance) of the lens group L32 from the center of the optical axis is proportional to an angle at which the optical axis is decentered. Thus, the lens group L32 may be moved from the center of the optical axis by an amount required for decentering the optical axis at a predetermined angle. A drive controller unit 21 of the lens group L32 drives and controls the lens group L32 which is a lens for blur correction, so as to move the lens group 32 vertically and horizontally in a plane orthogonal to the optical axis of the imaging optical system 20.

In the image capture device of the present embodiment as configured above, the lens group L32 is controlled via the drive controller unit 21 of the lens group L32 in a direction cancelling the motion of a captured image represented by a representative vector detected by a movement quantity detector unit 9 to decenter the optical axis, so that the motion of the image is corrected. As a result, even in the case where a plurality of persons are photographed as in the first embodiment, the subject image at the start of capturing can be kept in the picture frame without image blurring to prevent a change in composition.

The camera signal processing unit 5, the face detector unit 8, and the movement quantity detector unit 9 are achieved by, for example, a microcomputer. The microcomputer is achieved by an integrated circuit and has an image signal input unit for receiving the input of an image signal, a CPU, a storage unit, and an output unit for outputting a movement quantity. In the storage unit, a program for achieving the function of the camera signal processing unit 5, the face detector unit 8, the movement quantity detector unit 9, or the memory controller unit 10 is stored. The functions of the camera signal processing unit 5, the face detector unit 8, and the movement quantity detector unit 9 are implemented based on the program.

Third Embodiment

An image capture device according to a third embodiment of the present invention will be described with reference to FIG. 8. In the present embodiment, the combined use of a correction optical mechanism for decentering or tilting the optical axis of the imaging optics and image read control from a memory 6 will be described as a unit for correcting the motion of subject image. The same elements in FIG. 8 as in FIG. 1 of the first embodiment and FIG. 7 are indicated by the same reference numerals, and an explanation thereof is omitted.

Figure 8:
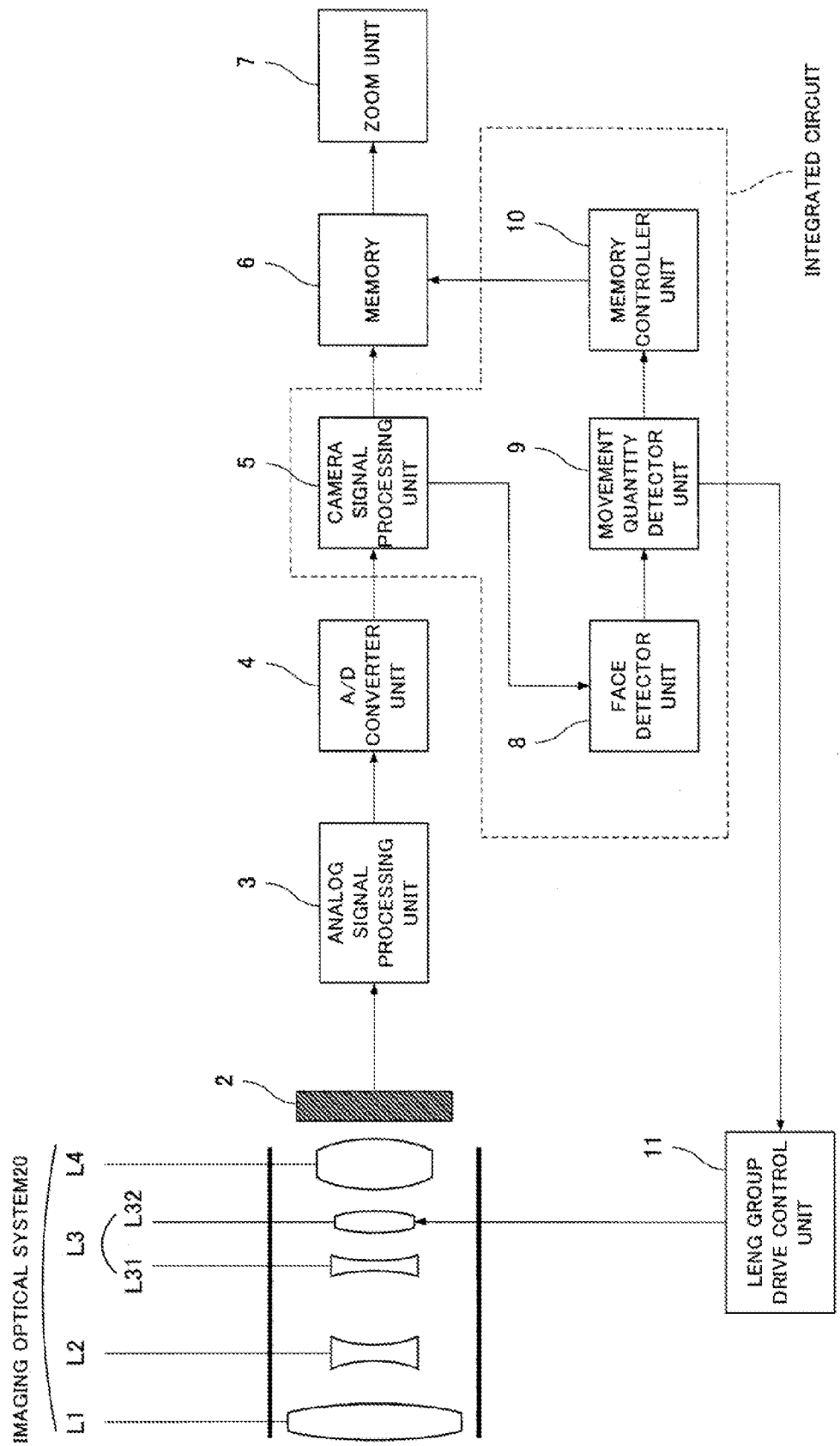
FIG. 8 is a block diagram of an image capture device according to a third embodiment of the present invention.

FIG. 8 is a block diagram of the image capture device according to the third embodiment of the present invention. In the present embodiment, the units for correcting the motion of an image (the image read control from the memory 6 and the correction optical mechanism) in the above-described two embodiments are combined, so that the motion correction effect of the subject image can be further increased.

Specifically, the correction optical mechanism typically has an operating band, and thus cannot follow a swift movement of the subject image exceeding the operating band in some cases. Further, in the configuration of the mechanism, variations in the manufacturing accuracy of mechanism parts and the operating accuracy due to assembly errors of the mechanism parts are inevitable, thereby affecting the motion correction performance in some cases. In contrast, the image read control from the memory 6 is electronic processing and is not affected by such variations or errors. However, from another perspective, the correction optical mechanism can secure a certain correction angle without depending on the focal distance of an imaging optical system 20. However, in the case of the image read control from the memory 6, the subject image largely moves as the focal distance increases. Thus, the size (pixel count) of an image read from the memory 6 has to be reduced in order to secure a sufficient motion correction range. Consequently, the quality of the finally outputted image is degraded.

Hence, the combined use of the image read control from the memory 6 and the correction optical mechanism can ensure higher correction performance as compared to when the image read control from the memory 6 and the correction optical mechanism are separately used.

Specifically, a lens group L32 is controlled via a drive controller unit 21 of the lens group L32 in a direction cancelling the motion of a captured image represented by a representative vector detected by a movement quantity detector unit 9 to decenter the optical axis, so that the motion of the image is corrected. The movement quantity detector unit 9 detects the movement quantity (representative vector) of the subject image remaining in the captured image, and controls the image read from the memory 6 based on the movement quantity. As a result, even in the case where a plurality of persons are photographed as in the first and second embodiments, the subject image at the start of capturing can be kept in the picture frame without image blurring to prevent a change in composition.

Other Embodiments

In the above embodiments, processing including steps 106 and 108 is performed based on the assumption that persons in the subject individually move, but the configuration is not limited to this. For example, in the case where persons in a subject are arrayed in lines and hardly move (for example, in chorus or ensemble), primary effects can be produced without performing steps 106 and 108.

For the motion correction unit, an optical system may be used which is made of a variable angle prism (VAP) obtained by connecting two glass sheets with bellows, filling the inside with a liquid having a high refractive index, and changing the angles of the glass sheets to decenter the optical axis.

In the second embodiment of the present invention, the lens group L32 is moved as the motion correction unit, but the configuration is not limited to this. The imaging optical system 10, the image capture element 2, and so on may be rotatably supported and driven with respect to the casing of the image capture device to correct the motion.

In all the embodiments of the present invention, sequence of steps including detection of faces is performed for each imaging period, but the configuration is not limited to this. When a subject slightly moves, a single step may be performed for multiple frames. Thus, for example, an effect to reduce the power consumption of the device can be achieved.

In all the embodiments of the present invention, not to mention that known image stabilization technology and image motion correction technology (for example, known techniques listed in the Background Art) may be combined for image motion correction, higher image stabilization effect can be achieved in such a configuration.

In all the embodiments of the present invention, the faces of human figures are detected, but the configuration is not limited to this. For example, persons may be detected with body shapes, colors and designs of clothes, and so on as information for detection. Even in such a case, the effect at which the present invention aims can be clearly obtained.

In all the embodiments of the present invention, when the relative positions of multiple faces fluctuate, the positions are adjusted in the x and y directions for correction, but the configuration is not limited to this. For example, when gaps between the faces increase in size due to the fluctuations of the relative positions, zooming may be performed toward the wide-angle side to reduce the focal distance such that the faces fall within the image. Further, when the gaps between the faces decrease in size due to the fluctuations of the relative positions, zooming may be performed toward the telephoto side to increase the focal distance such that the faces do not come too closer to each other. This can prevent changes in composition due to variations in distance from the subject. Also in this case, when the fluctuations of the relative positions are larger than a predetermined value, correction may be stopped.

In all the embodiments of the present invention, an object to be corrected is a human figure, but the object is not limited to this. The object to be corrected may be automobiles, bicycles, buildings and billboards as subjects so as not to change the compositions.

Characteristics of Embodiments

The characteristics of the above-described embodiments will be listed below. The inventions of the embodiments are not limited to the after-mentioned. Please note that the specific examples of configurations are described in parentheses following the configurations to assist in understanding the characteristics. The configurations are not limited to the specific examples. Configurations other than the described characteristics may be modified or deleted to obtain the effects of the characteristics.

F1

The image capture device includes:

imaging optical systems (1, 10) for forming the optical image of a subject;

an image capture element (2) for converting the formed optical image into an image signal;

a feature detector unit such as a face detector unit (8) for detecting features including the face regions of multiple objects such as human figures contained in an image represented by the image signal, based on the image signal obtained by the image capture element;

a positional relationship detector unit (9) for detecting the positional relationship of the features of the objects including the face regions of the human figures;

a movement quantity detector unit (9) for detecting the movement quantities of the features of the objects including the face regions of the human figures; and composition change correction units (10, 11, L32) for correcting a change in composition of the image based on the detection results of the positional relationship detector unit and the movement quantity detector unit.

Thus, it is possible to suppress blurring of images, keep the subject images at the start of capturing in the picture frame, and prevent a change in composition, even when multiple objects such as persons are photographed over a long time.

F2

The image capture device of F1 further includes a specific article detector unit (8) for detecting the feature of a specific object out of the objects, wherein the positional relationship detector unit (9) detects the positional relationship between the feature of the specific object detected by the specific article detector unit (8) and the feature of at least any one of the other objects.

F3

The image capture device of F1, wherein the movement quantity detector unit detects the relative positional relationship between the multiple objects such as the human figures contained in the same image, and a change in the positional relationship of the features of the objects, and the composition change correction unit corrects the motion of the image based on the movement quantities of the objects when a variation in the positional relationship is a certain amount or less.

Thus, it is also possible to capture an image without a feeling of strangeness even when objects such as human figures in a subject individually move.

F4

The image device of F1, wherein
the composition change correction unit has a memory (6) for storing the image signal, and a memory controller unit (10) for reading a part of the image signal stored in the memory.

F5

The image capture device of F1 wherein the composition change correction unit is driven relative to the imaging optical system, and has a correction optical element for decentering the optical axis of the imaging optical system and moving the optical image in the imaging surface.

F6

The image capture device of F1, wherein the composition change correction unit has a driving portion for displacing the image capture element in a direction orthogonal to the optical axis.

F7

An integrated circuit includes:
an image signal input unit for receiving the input of an image signal;
a feature detector unit for detecting the features including the face regions of multiple objects such as human figures contained in an image represented by the image signal, based on the image signal;
a positional relationship detector unit for detecting the positional relationship of the features of the objects;
a movement quantity detector unit for detecting the movement quantities of the features of the objects; and
a composition change correction unit for correcting a change in the composition of the image based on the detection result of the movement quantity detector unit and the detection result of the movement quantity detector unit.

Thus, it is possible to provide an integrated circuit which can achieve an image capture device capable of suppressing blurring of images, keeping a subject image at the start of capturing in the picture frame, and preventing a change in composition even when a plurality of persons are photographed over a long time.

F8

The integrated circuit of F7, wherein
the movement quantity detector unit further detects the relative positional relationship between the objects such as the human figures contained in the same image, and a change in the positional relationship of the features of the objects, and
the composition change correction unit corrects the change in the composition of the image based on the movement quantities of the objects when a variation in the positional relationship is a certain amount or less.

Thus, it is also possible to provide an integrated circuit which can achieve an image capture device capable of capturing an image without a feeling of strangeness even when objects such as human figures in a subject individually move.

F9

An integrated circuit includes:
an image signal input unit for receiving the input of an image signal;
a feature detector unit for detecting the features including the face regions of multiple objects such as human figures contained in an image represented by the image signal, based on the image signal;
a positional relationship detector unit for detecting the positional relationship of the features of the objects;
a movement quantity detector unit for detecting the movement quantities of the features of the objects; and
an output unit for outputting the movement quantities.

Thus, it is possible to provide an integrated circuit which can achieve an image capture device capable of suppressing blurring of images, and keeping a subject image at the start of capturing in the picture frame even when a plurality of objects such as persons are photographed over a long time.

F10

The integrated circuit of F9, wherein
the movement quantity detector unit further detects the relative positional relationship between the objects such as the human figures contained in the same image, and a change in the positional relationship of the features of the objects, and
the output unit outputs the movement quantities when a variation in the positional relationship is a certain amount or less.

Thus, it is also possible to provide an integrated circuit which can achieve an image capture device capable of capturing an image without a feeling of strangeness even when objects such as human figures in a subject individually move.

INDUSTRIAL APPLICABILITY

The present invention can be applied to image capture devices such as digital cameras and video movies having an image stabilizing function.

The invention claimed is:
1. An image capture device comprising:
an imaging optical system for forming an optical image of a subject;
an image capture element for converting the formed optical image into an image signal;
a memory that stores the image signal obtained by the image capture element for one frame and is capable of reading out the stored image signal from any address;
a feature detector unit for detecting a plurality of features contained in an image represented by the image signal for one frame based on the image signal obtained by the image capture element, and outputting positional information of positions of the features and a positional relationship of the features;
a movement quantity detector unit that includes a positional relationship detector unit for storing the positional information of the features supplied from the feature detector unit, calculates a difference between the positional information of the features in the previous frame and the positional information of the features in the current frame as a vector based on the positional information of the features obtained for one frame, and detects movement quantities of the features; and
a memory controller unit that controls an image read address from the memory in response to an instruction from the movement quantity detector unit, causes the memory to output an image in any position, and corrects a motion of the image to correct a change of a composition, wherein the movement quantity detector unit instructs the memory controller unit to read out an image from the memory in a direction eliminating the difference between the positional information of the features.

2. The image capture device according to claim 1, further comprising a specific article detector unit for detecting a specific feature out of the plurality of features, wherein the movement quantity detector unit detects a positional relationship between the specific feature detected by the specific article detector unit and a feature of at least any one of the other features.

3. An integrated circuit comprising:

an image signal input unit for receiving input of an image signal;

a memory that stores the image signal obtained by the image signal input unit for one frame and is capable of reading out the stored image signal from any address;

a feature detector unit for detecting a plurality of features contained in an image represented by the image signal for one frame based on the image signal inputted by the image signal input, and outputting positional information of positions of the features and a positional relationship of the features;

a movement quantity detector unit that includes a positional relationship detector unit for storing the positional information of the features supplied from the feature detector unit, calculates a difference between the positional information of the features in the previous frame and the positional information of the features in the current frame as a vector based on the positional information of the features obtained for one frame, and detects movement quantities of the features; and a memory controller unit that controls an image read address from the memory in response to an instruction from the movement quantity detector unit, causes the memory to output an image in any position, and corrects a motion of the image to correct a change of a composition, wherein the movement quantity detector unit instructs the memory controller unit to read out an image from the memory in a direction eliminating the difference between the positional information of the features.

* * * * *